United States Patent [19]  [11] Patent Number: 4,983,422
Davis et al.  [45] Date of Patent: Jan. 8, 1991

[54] PROCESS FOR FORMING ALUMINUM OXIDE CERAMIC COMPOSITES

[75] Inventors: H. O. Davis, Alameda; Marvin Pennell, San Leandro, both of Calif.

[73] Assignee: Kaiser Aerotech, San Leandro, Calif.

[21] Appl. No.: 166,958

[22] Filed: Mar. 11, 1988

[51] Int. Cl.$^5$ .............................................. B05D 3/02
[52] U.S. Cl. .................................... 427/228; 427/249;
427/255; 427/255.2; 427/255.3; 427/376.2;
427/380; 427/419.2; 427/419.3; 427/419.7
[58] Field of Search ............... 427/226, 228, 249, 255,
427/255.2, 248.1, 294, 376.2, 377, 380, 376.1,
419.2, 419.3, 419.7

[56] References Cited

U.S. PATENT DOCUMENTS

| 3,330,697 | 7/1967 | Pechini | 117/215 |
| 3,849,181 | 11/1974 | Green | 427/376.2 |
| 4,275,095 | 6/1981 | Warren | 427/419.7 |
| 4,552,786 | 11/1985 | Berneburg et al. | 427/255 |
| 4,735,856 | 4/1988 | Schultz et al. | 427/419.7 |
| 4,753,856 | 6/1988 | Haluska et al. | 427/419.7 |

FOREIGN PATENT DOCUMENTS 59-145787  8/1984  Japan ............................ 427/376.2

OTHER PUBLICATIONS

Eror and Anderson (1986), "Polymeric Precursor Synthesis of Ceramic Materials", Better Ceramics Through Chemistry II, C. J. Brinkes, D. E. Clark, D. R. Ulrich, eds. Material Research Society, Pittsburg, Pa., pp. 571–577.

*Primary Examiner*—Sadie Childs
*Attorney, Agent, or Firm*—Townsend and Townsend

[57] ABSTRACT

Aluminum oxide ceramic composite articles having high flexural and tensile strength are produced by introducing a liquid aluminum oxide precursor material into a ceramic reinforcement fabric, curing the precursor material at an elevated temperature, and converting the cured precursor material to an aluminum oxide ceramic by pyrolysis at temperatures which do not result in the degradation of the reinforcement material. Such ceramic composite articles are particularly useful for applications requiring a low dielectric constant and a high mechanical strength.

14 Claims, No Drawings

PROCESS FOR FORMING ALUMINUM OXIDE CERAMIC COMPOSITES

BACKGROUND OF THE INVENTION

1. Field of the Invention

The present invention relates generally to the production of structural ceramic materials, and more particularly to a process for producing reinforced aluminum oxide ceramic materials by application of a liquid aluminum oxide precursor onto a reinforcement fabric and pyrolytic conversion of the precursor to an aluminum oxide ceramic matrix phase.

Structural ceramic materials are utilized in a wide variety of high temperature and high strength applications. Such ceramic materials usually comprise a composite including reinforcement phase, usually a fabric formed from a plurality of individual reinforcement fibers, and a matrix phase which impregnates the reinforcement fabric. The reinforcement fabric provides the structural component of the composite, enhancing the tensile and flexural strength. The matrix phase bonds the filaments, yarns, and layers of fabric and enhances the bulk and compressive strength of the composite article.

Because of its low dielectric constant, it would be desirable to utilize an aluminum oxide ceramic as the matrix phase for certain ceramic composite articles. Heretofore, however, the impregnation of a reinforcement phase with aluminum oxide has been problematic. While powdered aluminum oxide can be introduced and converted to a semi-continuous phase by sintering, the high temperatures and pressures required will usually degrade any reinforcement materials which may be present in the ceramic Moreover, penetration of powders within the reinforcement fabric is uneven resulting in a non-uniform distribution of the matrix phase in the composite.

It is therefore an object of the present invention to provide methods for preparing aluminum oxide ceramic composites which have an even distribution of the ceramic within the reinforcement fabric and which do not require high temperature processing. It would be particularly desirable to provide a liquid aluminum oxide precursor substance which can be uniformly introduced to the reinforcement fabric and converted to the ceramic matrix phase by a relatively low temperature conversion.

2. Description of the Background Art

The preparation of ceramic materials from organic precursors is described in Eror and Anderson, "Polymeric Precursor Synthesis of Ceramic Materials", Better Ceramics Through Chemistry II, C. J. Brinkes, D. E. Clark, D. R. Ulrich, eds. Material Research Society, Pittsburg, Pa., pp. 571-577 (1986). Polybasic acid chelates are formed with certain cations and undergo polyesterification when heated in a polyhydroxyl alcohol. The resulting polymeric glass has the cations uniformly distributed throughout and may be calcined at low temperature to yield fine particulate oxides. U.S. Pat. No. 3,330,697 to Pechini describes a process for preparing titanium, zirconium, and niobium ceramics as capacitor dielectrics. The ceramics are prepared by dissolving an appropriate salt in a polyhydroxyl alcohol in the presence of a polybasic acid to form a chelate. The addition of ethylene glycol causes esterification and polymerization occurs upon heating. The resulting liquid can be calcined to form the ceramic. Copending applications Ser. No. 878,454 and Ser. No. 046,956 describe the preparation of ceramic composites by introducing a polycarbosilane onto a fiber reinforcement fabric, curing the polycarbosilane at an elevated temperature under non-oxidizing conditions, and converting the cured polycarbosilane to a silicon carbide ceramic by pyrolysis.

SUMMARY OF THE INVENTION

Aluminum oxide ceramic composite articles having high flexural and tensile strength are produced by introducing a novel liquid aluminum oxide precursor material onto a fiber reinforcement fabric, curing the precursor material at an elevated temperature, and converting the cured precursor material to an aluminum oxide ceramic by pyrolysis at relatively moderate temperatures. The aluminum oxide precursor material is a solution having from about 5% to 35% ionic aluminum by weight present in an aqueous alcohol mixture in the presence of a strong mineral acid The viscosity of the precursor material will be below about 250 cp, usually being below about 200 cp, in order to facilitate penetration of the liquid precursor material into the fabric. As the pyrolysis causes substantial shrinkage of the precursor material, the composite article is preferably densified by repeating the steps of precursor introduction, curing, and pyrolysis from one to ten times, usually from three to six times. Desirably, refractory interface layers may be formed over the reinforcement fabric and between adjacent layer of the aluminum oxide matrix phase, resulting in laminar structures which are resistant to crack propagation and which possess flexural strengths on the order of 10,000 psi and above.

DESCRIPTION OF THE SPECIFIC EMBODIMENTS

According to the present invention, aluminum oxide (alumina) ceramic composite articles are prepared by introducing a liquid aluminum oxide precursor material into a reinforcement fabric, usually a ceramic reinforcement fabric, curing the precursor material to set the desired geometry, and converting the cured precursor material to an aluminum oxide ceramic by pyrolysis. The present invention can employ virtually any conventional two- or three-dimensional ceramic fabric, and will find use as well with porous core substrates to form sandwiched ceramic articles.

For the most part, the present invention will utilize conventional two- or three-dimensional reinforcement fabrics produced by weaving refractory strands, either single fibers or yarns, into a desired geometry. The strands are composed of a wide variety of materials, such as alumina, boron/tungsten, boron carbide, boron carbide/tungsten, boron nitride, beryllium, carbon, silicon carbide, zirconia, and combinations thereof Typically, single fibers will have a diameter in the range from 1 to 150 microns, and yarns will be comprised of from about 100 to 20,000 fibers, more typically from about 3,000 to 6,000 fibers.

Preferred is the use of aluminum oxide (alumina) based reinforcement fibers which minimize the effective dielectric constant of the composite article. Suitable alumina based reinforcement fibers can be formed from Nextel ® 440 and Nextel ® 880, available from 3M Company, St. Paul, Minn. 55119.

A variety of suitable forming techniques are available, including two- and three-dimensional weaving, filament winding, tape wrapping, and three-dimensional/multiple-dimensional weaving. The method of the present invention is of particular interest when utilized with three-dimensional and multiple-dimensional weaving techniques. A number of proprietary three-dimensional weaving systems are available, such as the Ultraweave system, available from FMI, the Avco/Brochere system, available from Avco/Brochere, Lowell, Massachusetts, the Aerospatiala, available from Hercules, Inc. The method is also suitable with various pultrusion processes, where linear elements are formed.

A preferred method for forming the reinforcement fabrics is described in U.S. patent application Ser. No. 852,066, filed on Apr. 15, 1986, and assigned to the assignee of the present invention. The disclosure of application Ser. No. 852,066 is incorporated herein by reference.

Suitable liquid aluminum oxide (alumina) precursor materials will comprise an ionic aluminum solution comprising from about 5% to 35% aluminum by weight, more usually comprising about 15% to 25% aluminum by weight, and having a viscosity below about 250 cp, preferably being below about 200 cp. The aluminum ion will be present in an aqueous alcohol mixture in the presence of a strong mineral acid selected to promote the dissolution of an aluminum precursor substance, typically aluminum hydroxide, or an aluminum salt.

The aluminum precursor substance is added to the aqueous alcohol mixture, typically at a weight percent in the range from about 10% to 50%, more typically in the range from about 20% to 40% with the alcohol:water volume ratio in the range from about 1:3 to 1:1, usually being about 3 5. After mixing, sufficient mineral acid is added to promote dissolution of the aluminum precursor substance, typically being from about 10 to 20 volume percent of the initial water-alcohol mixture. The mixture is then heated at a temperature just below its normal boiling point, typically in the range from about 85.C to 95.C, and the dissolution observed. Once the solution is clear, typically after several hours, the aluminum precursor substance has been dissolved into solution. The mixture is suitable for use as the aluminum oxide precursor material of the present invention at this point, although it may be desirable to further evaporate the water-alcohol phase in order to increase the aluminum content and/or viscosity of the solution. The viscosity, however, will be maintained below 250 cp in order to be useful in the method of the present invention.

Suitable aluminum precursor substances are those which will dissolve in the procedure just described, yielding aluminum ion in solution. In addition to aluminum hydroxide and suitable aluminum salts include aluminum nitrate, and aluminum halides, such as aluminum chloride.

Suitable alcohols include monohydric alcohols, such as methanol and ethanol; dihydric alcohols, such as ethylene glycol; and polyhydric alcohols, such as glycerol Preferred is the use of ethylene glycol.

Prior to introducing the liquid aluminum oxide precursor material to the reinforcement fabric, it is usually desirable to form a refractory interface layer over the fabric. The refractory interface layer acts as a barrier or buffer which inhibits crack propagation through the ceramic matrix to the reinforcement fabric, and thus acts to increase the strength (i.e., inhibit cracking) of the composite article.

The refractory material is usually a ceramic, such as alumina, boron nitride, carbon, silicon carbide, silicon dioxide, and the like, preferably boron nitride, and will be applied to the thickness in the range from about 0.1 to 3 $\mu$m, more usually from about 0.1 to 1 $\mu$m. Conveniently, the refractory material may be applied by conventional chemical vapor deposition techniques, or by application of a thin layer of an organic material, such as pitch, followed by pyrolytic conversion to carbon.

The liquid aluminum oxide precursor material is prepared for introduction to the reinforcement fabric by removing entrained air, moisture, and volatiles in a vacuum desicator. The viscosity is not critical, and will depend on how long the material has been heated in the preparation process. For manual lay-up techniques where the precursor material is applied by spreading on the fabric, it is desirable to have a relatively high viscosity. In contrast, when the precursor materials are applied by immersion, a lower viscosity is desirable. The precursor materials may also be introduced by extruding a layer of a predetermined thickness onto the fabric and pressing the material into the fabric. The thickness of the precursor material depends on the thickness of the fabric, and the viscosity is not critical.

After initial application, the liquid aluminum precursor material is heated in order to cure the material and set the geometry of the resulting composite matrix. The curing will also drive off the solvent and other volatiles from the precursor liquid preparation. Curing is accomplished at temperatures in the range from about 125° to 200° C., usually from about 150° to 170° C., for a period of from about 1 to 3 hours.

In the preferred embodiment, the reinforcement fabric having the uncured aluminum oxide precursor material is placed in a vacuum bag, with a vacuum being drawn in order to conform the bag to the shape of the fabric. The composite article is then heated, typically under a pressure of about 50 psi, for a time period of from about 1 to 3 hours. Alternatively, two-dimensional composite articles may be cured in a hot press or an autoclave, if desired. The cured or partially-cured composite articles obtained after this step may be stored or transported for further processing elsewhere, or may be immediately processed to produce the final composite article of the present invention.

After curing, the liquid aluminum oxide precursor material is converted to aluminum oxide ceramic matrix by exposure to an elevated temperature under oxidizing conditions Usually, the temperature will be raised in a stepped profile from room temperature to a final temperature over a period of from about 20 to 30 hours and held at the final temperature for a period of from about 2 to 10 hours. The gradual temperature rise allows thermal acclimation of the material as well as allowing the slow release of the oxidation products. The final temperature will be above about 800° C., usually being between 850° and 950° C. A preferred temperature profile is set forth in the Experimental section hereinafter.

The product of the process as just described will be a highly porous ceramic having a relatively low density, usually on the order of about 1.3 to 1.5 g/cc. In order to increase the density and strengthen the final composite article, the product is usually densified from about 1 to 10 additional times, usually about 3 to 6 additional times, depending on the desired final density. In this way, the product having a final density in the range from about 1 8 to 2.5 g/cc, usually in the range from about 2.0 to 2.2 g/cc, can be obtained.

Each stage of densification generally follows the same steps described above for the initial introduction and conversion of the aluminum oxide precursor to the reinforcement fabric. A refractory interface layer can be introduced between successive layers of the aluminum oxide matrix, typically by either chemical vapor deposition or by pyrolytic conversion of an organic material. The next layer of liquid aluminum oxide precursor is then introduced, usually by vacuum impregnation. Thereafter, the aluminum oxide precursor material is cured at a temperature in the range from about 125° to 200° C., usually from about 150° to 170° C. for a period of from about 1 to 3 hours. Pyrolysis of the cured aluminum oxide precursor material follows substantially the same steps set forth hereinabove. The final product of this process will thus comprise a laminar structure including alternating layers of a refractory interface and an aluminum oxide matrix phase. The product will usually include at least 2 matrix layers, more usually including from 3 to 6 matrix layers, and may include as many as 10 or more matrix layers. Such a laminar structure has been found to possess very high tensile and flexural strength and to resist failure due to crack propagation.

The following examples are offered by way of illustration, not by way of limitation.

EXPERIMENTAL

A five harness satin, 23 warp and fill count Nextel 440 fabric (3M Corporation, Minneapolis, Minn.) was coated with boron nitride to a thickness of about 0.22 μm by a CVD technique and then impregnated with a mixture of 50 weight percent liquid alumina precursor and 50 weight percent alumina powder. The liquid alumina precursor consisted of 25% aluminum oxide in ethylene glycol. The Nextel plies were saturated with the precursor/alumina mixture, and the impregnated Nextel 440 plies were used to fabricate oxide panels (six plies) by a hand lay-up and vacuum bag process. The panels were cured at 160° C. for 2 hours at 50 psi. The cured panels were then converted in air with a heating cycle as shown below: (a) from room temperature to 180° C. in 2 hours; (b) 180° C. to 340° C. in 6 hours; (c) 340° C. to 400° C. in 6 hours; (d) 400° C. to 500° C. in 6 hours; (e) 500° C. to 900° C. in 8 hours; (f) hold at 900° C. for 5 hours; and (g) cool to 150.C in 2 hours.

The converted panels were then vacuum impregnated to saturation with additional liquid alumina precursor having 50% by weight alumina powder in a vacuum desiccator and cured, and the impregnation and curing repeated prior to conversion. After removal of the excess polymer the impregnated specimens went through the 900° C. conversion cycle shown above. This impregnation, curing, and conversion process was repeated five times to achieve a desirable density.

The panels so formed had a density of about 2.0 g/cc and a fracture strength of about 10,000 psi.

Although the foregoing invention has been described in some detail by way of illustration and example for purposes of clarity of understanding, it will be obvious that certain changes and modifications may be practiced within the scope of the appended claims.

What is claimed is:

1. A process for forming aluminum oxide ceramic composites, said process comprising:
   introducing a liquid aluminum oxide precursor material into a reinforcement fabric substrate wherein said liquid aluminum oxide precursor is ionic aluminum suspended in a n aqueous alcohol solution in the presence of a mineral acid;
   curing the aluminum oxide precursor; and
   converting the cured aluminum oxide precursor material to an aluminum oxide ceramic phase by oxidation at an elevated temperature.

2. A process as in claim 1, wherein the liquid aluminum oxide precursor has a viscosity below 250 cp.

3. A process as in claim 1, wherein the aqueous alcohol solution is an aqueous dihydric alcohol solution.

4. A process as in claim 3, wherein the dihydric polyol is ethylene glycol.

5. A process as in claim 1, wherein the liquid aluminum precursor is cured at a temperature in the range from about 125° to 200° C. for a time period in the range from about 1 to 3 hours.

6. A process as in claim 1, wherein the pyrolysis step includes a stepped increase in temperature to a final temperature in the range from about 850° to 950° C.

7. A process for forming aluminum oxide ceramic composites, said process comprising:
   (a) forming a refractory interface layer on a reinforcement fabric;
   (b) introducing a liquid aluminum oxide precursor material onto the reinforcement fabric over the refractory interface layer, wherein said liquid aluminum oxide precursor is ionic aluminum suspended in an aqueous alcohol solution in the presence of a mineral acid;
   (c) curing the liquid aluminum oxide precursor material at an elevated temperature;
   (d) converting the cured liquid aluminum oxide precursor material to a ceramic by oxidizing under an elevated temperature; and
   (e) densifying the composite by repeating steps (a) through (d) until a desired density is attained.

8. A process as in claim 7, wherein the refractory interface layer is formed by chemical vapor deposition of a material selected from the group consisting of alumina, carbon, boron nitride, silicon dioxide, and silicon carbide to a thickness in the range from about 0.1 to 3 μm.

9. A process as in claim 7, wherein the refractory interface layer is formed by applying an organic precursor and pyrolyzing the precursor to form a carbon layer in the range from 0.1 to 3 μm.

10. A process as in claim 7, wherein the liquid aluminum oxide precursor has a viscosity below 250 cp.

11. A process as in claim 7, wherein the aqueous alcohol solution is an aqueous dihydric alcohol solution.

12. A process as in claim 11, wherein the dihydric alcohol is ethylene glycol.

13. A process as in claim 7, wherein the liquid aluminum oxide precursor is cured at a temperature in the range from about 125° to 200° C. for a time period in the range from about 1 to 3 hours.

14. A process as in claim 7, wherein the converting step (d) includes a stepped increase in temperature to a final temperature in the range from about 850° to 950° C.

* * * * *